(12) United States Patent
Baker

(10) Patent No.: US 6,470,648 B1
(45) Date of Patent: Oct. 29, 2002

(54) PACKAGING SEALER PRINTER

(75) Inventor: Tony D. Baker, Hudson, OH (US)

(73) Assignee: Advanced Poly-Packaging, Inc., Akron, OH (US)

( * ) Notice: Subject to any disclaimer, the term of this patent is extended or adjusted under 35 U.S.C. 154(b) by 9 days.

(21) Appl. No.: 09/598,229

(22) Filed: Jun. 22, 2000

(51) Int. Cl.[7] ............................. B65B 5/06; B65B 61/02
(52) U.S. Cl. ...................... 53/411; 53/459; 53/131.5; 53/570
(58) Field of Search ...................... 53/411, 459, 131.4, 53/131.5, 570, 385.1

(56) References Cited

U.S. PATENT DOCUMENTS

| | | | | |
|---|---|---|---|---|
| 2,037,825 A | * | 4/1936 | Salfisberg | 53/131.5 |
| 3,650,773 A | * | 3/1972 | Bush | 53/411 |
| 4,387,550 A | * | 6/1983 | Lerner | 53/570 |
| 4,586,318 A | * | 5/1986 | Litt | 53/570 |
| 4,899,520 A | * | 2/1990 | Lerner | 53/459 |
| 4,901,506 A | * | 2/1990 | Weyandt | 53/131.4 |
| 5,341,625 A | * | 8/1994 | Kramer | 53/570 |
| 5,626,004 A | * | 5/1997 | Gates | 53/570 |
| 5,761,877 A | * | 6/1998 | Quandt | 53/570 |

\* cited by examiner

Primary Examiner—John Sipos
(74) Attorney, Agent, or Firm—Renner, Kenner, Greive, Bobak, Taylor & Weber

(57) ABSTRACT

A packaging sealer printer employing a bag sealing mechanism in a printer assembly. The sealer printer transports a web of bags past a printing head and to a filling station and sealer assembly. The bags are sequentially indexed during the transporting operation. At the printing head, information regarding the content and/or recipient of the bag is printed on the bag. The same information is displayed on a video screen when the bag is indexed to the filling station and sealer assembly for filling by the operator. The bag is then sealed by a pressure bar pinching the bag against a spring plate and heater bar. A transfer printing tape is interposed between printing head and the bag to be printed. A low voltage sensing finger rides upon the web of bags and is operative to sense the presence of uniformly positioned apertures along the web of bags to assure and maintain proper registration of the bags with the printing head and filling and sealing stations during operation.

15 Claims, 3 Drawing Sheets

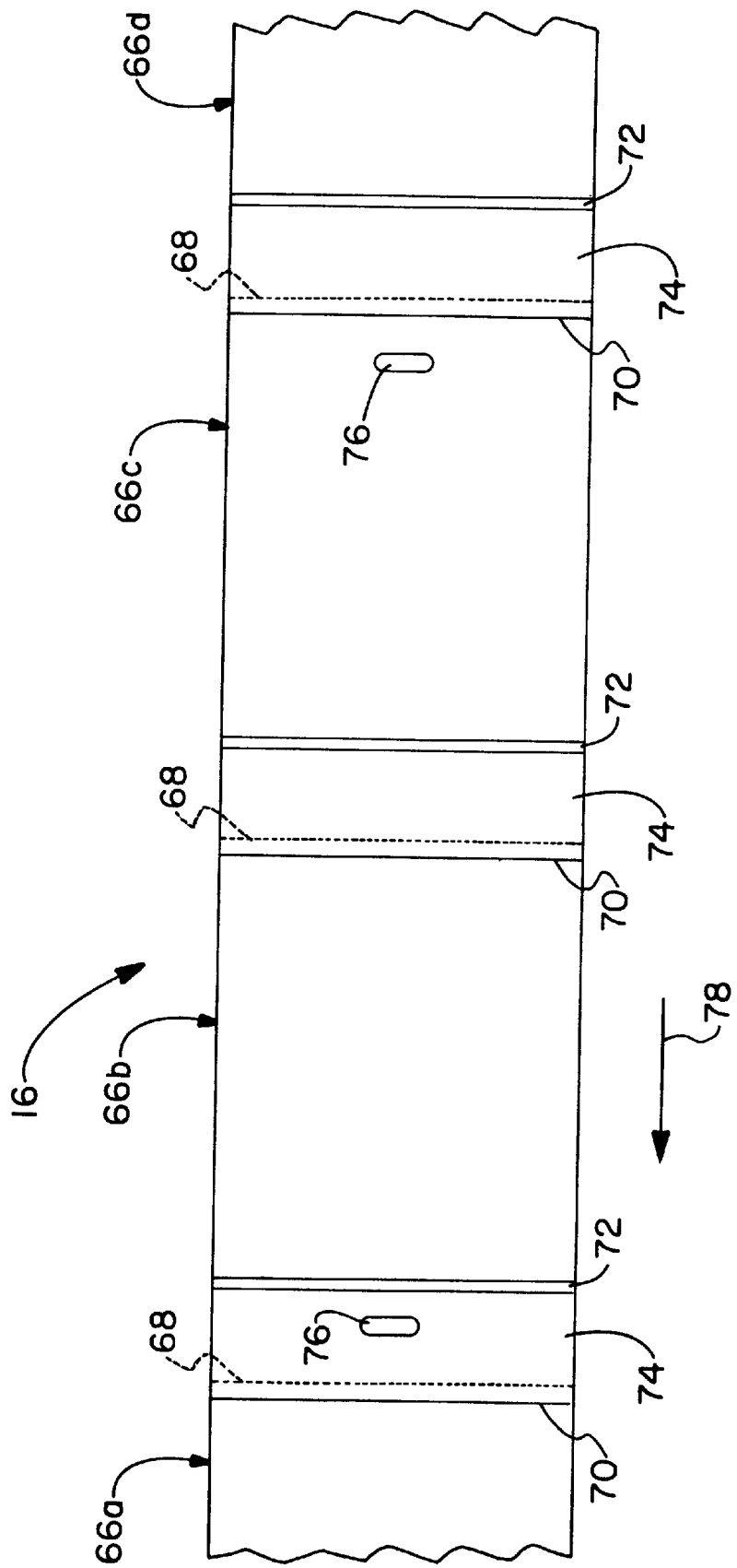

PACKAGING SEALER PRINTER

TECHNICAL FIELD

The invention herein resides in the art of packaging equipment. More particularly, the invention relates to packaging equipment in which bags are sequentially fed from a roll to a filling and sealing station at which materials are deposited into the bag and the bag is sealed and separated from an immediately adjacent bag. More particularly, the invention relates to an implementation of a printer immediately adjacent the sealing station for printing indicia onto the bag immediately prior to its receiving materials and being sealed and separated from the roll. Specifically, the invention relates to a combination of a package sealer and printer.

BACKGROUND OF THE INVENTION

Presently, it is well known to employ packaging equipment which allows for the dispensing of bags in the form of a web from a roll of bags to a filling station. At the filling station, materials, such assembly parts or the like are placed in the bag, following which the bag is sealed and separated from the web. Known packaging equipment of this type, often referred to as "baggers," generally include an air blower at the bagging station to blow the bag at the station open for easy receipt of the materials to be deposited therein. The bags on the web are typically perforated to allow for ease of separation from the web following filling and sealing. Generally, the bags into which the materials are placed are preprinted, the printing on the bag indicating either directly or by inference the specific materials received therein. While this type of an approach to packaging of parts and materials is generally acceptable and reasonably efficient where a large number of bags are to be sequentially filled with a complement of parts or materials, present systems are not given to customized packaging.

There are numerous applications for packaging systems in which the materials to be placed in the bags sequentially passing through the packaging station differ from bag to bag or, at the very least, vary among groups of bags. Moreover, while present packaging systems are typically given to relatively high degrees of accuracy, the applicability of packaging systems to applications demanding extremely high levels of accuracy are becoming more apparent. Presently, it is contemplated that prescription medicines may be dispensed using such packaging systems. Particularly, at hospitals, nursing homes, or other institutions requiring high volumes of medication, packaging tailored to the specific needs of the numerous patients and residents being cared for is quite attractive. Obviously, when dispensing medications, it is extremely important that the proper medications are placed into the bag before it is sealed and that the medications are associated with the specifically intended recipient, whether a patient or resident. Indeed, in such instances, it is most desirable that the patient's name, identification number, medication, and time for taking the same all be on the packaging receiving the medication. It is further important that the information respecting the medications to be packaged in the bags be made available to the operator of the packaging system at the time the bag is presented for filling.

There is a need in the art for a system which allows for the printing, filling and sealing of bags at a single station and which assures the materials placed in the bag comport with the labeling on the bag.

DISCLOSURE OF INVENTION

In light of the foregoing, it is a first aspect of the invention to provide a packaging sealer printer in which sealing and printing apparatus are maintained together.

Another aspect of the invention is the provision of a packaging sealer printer in which the printing of a bag immediately precedes its filling and sealing.

Another aspect of the invention is the provision of a packaging sealer printer which accommodates customized packaging activities.

Still a further aspect of the invention is the provision of a packaging sealer printer in which the specific materials to placed into a bag are printed on the bag immediately prior to its being filled and the information regarding such filling is then displayed on a screen at the time such bag is indexed for filling.

Still a further aspect of the invention is the provision of a packaging sealer printer which is highly accurate in operation, easily programmable to accomodate any of a broad range of packaging characteristics, and conducive to implementation with state of the art packaging sealers and printers.

The foregoing and other aspects of the invention which will become apparent as the detailed description proceeds are achieved by a packaging system, comprising: a roll of bags to be filled with product; a filling station to which bags are indexed and at which the product is placed into the bags and the bags are sealed; a printer interposed between said roll of bags and said filling station; and a control unit operatively interconnected between said roll of bags, printer and filling station, said control unit effecting the printing, indexing, filling and sealing of said bags.

Other aspects of the invention which will become apparent herein are achieved by a roll of bags for use in a packaging system, comprising: a continuous web of interconnected open ended bags, said bags being separable by perforations passing laterally across said web; and wherein each bag of said web has an aperture passing therethrough, said aperture allowing passage completely through each said bag in a direction normal to said web.

Still further aspects of the invention are attained by a method for filling bags with product, comprising: indexing a continuous web of bags, one-by-one, to a printing station; printing information on a bag at the printing station relative to a product to be placed into the bags; indexing the continuous web of bags, one-by-one, from the printing station to a filling station; presenting the printed bag at the filling station; filling product into the printed bag at the filling station, sealing the printed bag, and removing the sealed, filled and printed bag from the web; and continuing the sequential printing, filling, sealing and removing until a desired quantity of such bags has been processed.

DESCRIPTION OF THE DRAWINGS

For a complete understanding of the objects, techniques and structure of the invention, reference should be made to the following detailed description and accompanying drawings wherein:

FIG. 3 is a top plan view of an illustrative portion of a web of bags adapted for use in accordance with the invention, such web illustrating bags of two different designs.

BEST MODE FOR CARRYING OUT THE INVENTION

Figure 1:
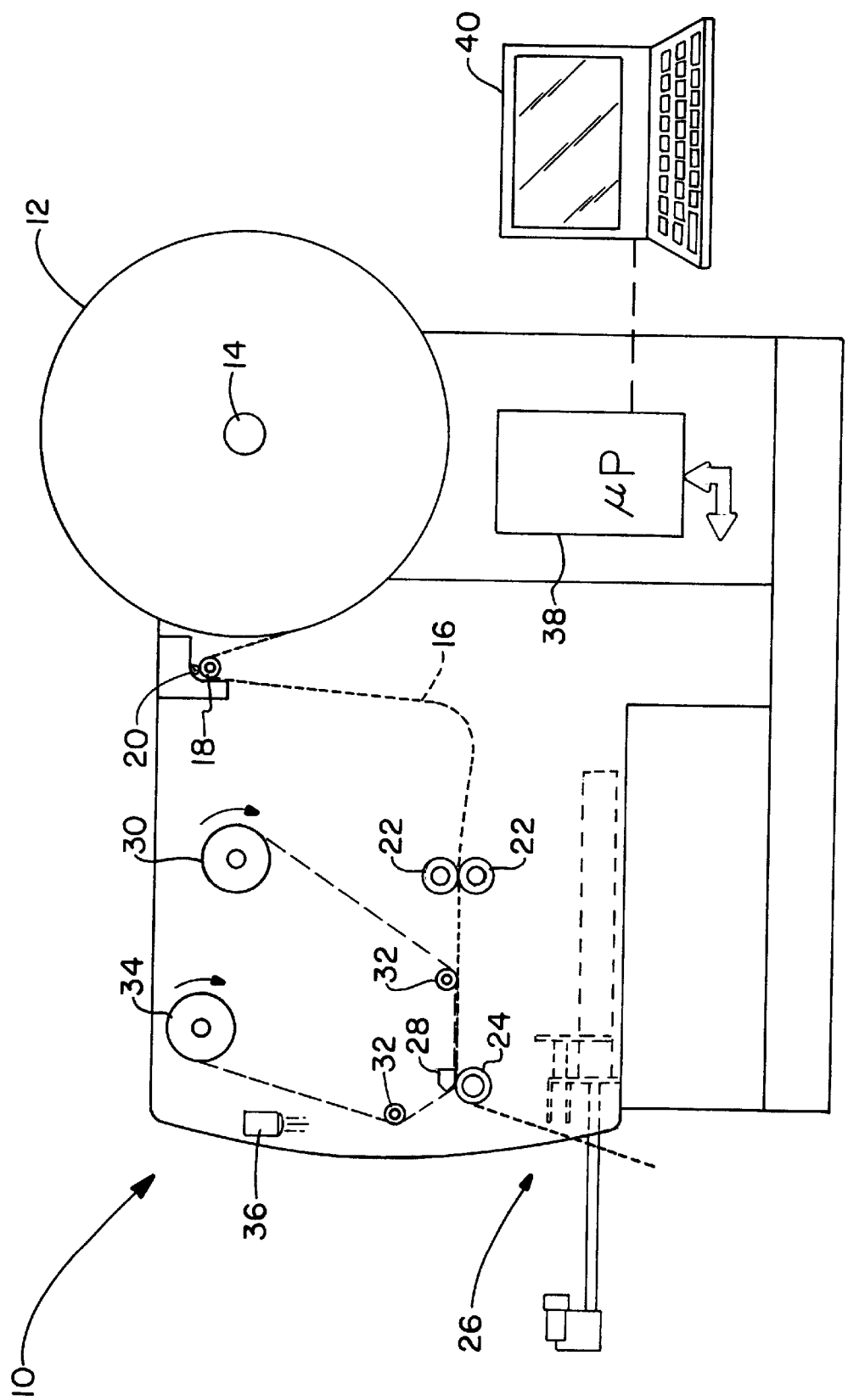
FIG. 1 is a side schematic view of a packaging sealer printer made in accordance with the invention.

Referring now to the drawings and more particularly FIG. 1, it can be seen that a packaging sealer printer made in accordance with the invention is designated generally by the numeral 10. In the assembly 10, a bag roll 12 is rotatably mounted upon a spindle 14 such that a web of bags 16 may be pulled therefrom and passed through a printing and packaging/sealing station in a manner to be described herein.

As shown in FIG. 1, the web of bags 16 passes across an electrically grounded roller bar 18 and beneath the contacting engagement of a sensing finger 20 positioned thereover. As will be discussed later herein, the sensing finger 20 rides against the web of bags 16 upon electrically grounded roller bar 18 to monitor the positioning of web 16 for purposes of indexing and registration.

The web 16 then passes through a pair of idler rollers 22 to a drive roller 24 which feeds the leading bag of the web 16 to the filling station and sealer assembly 26 of the unit 10. A printing head 28 is positioned above drive roller 24 and immediately prior to the filling station and sealer assembly 26. In the preferred embodiment of the invention, and as will become apparent later herein, the printer 28 is effective to print material upon the next succeeding bag in the web 26 from the bag exposed at the station 26 for filling by an operator. A roll of transfer printing tape 30 is maintained within the assembly for imprinting selected material upon the bags. The printing tape 30 passes beneath idler rollers 32 and the printing head 28 interposed therebetween, with the tape being taken up by the driven take-up roll 34.

Those skilled in the art should appreciate that the system 10 basically comprises a modified printer that is readily available in the industry. In the preferred embodiment of the invention, the printer is a Tec Thermal Transfer Model 872 by Tec Corporation of Tokyo, Japan, as described in the Owner's Manual publication of that company designated EM1-33039. In accordance with the preferred embodiment of the invention, the printer is simply modified to receive and accept the filling station and sealer assembly 26, with appropriate control logic, to function as the packaging sealer printer presented herein.

As further shown in FIG. 1, a blower 36 is positioned above filling station and sealer assembly 26 to blow open the bags of the web 16 when received at the station and assembly 26. In this regard, it will be appreciated that the bag roll 12 is simply a series of longitudinally interconnected preopened bags. A control unit 38, preferably a dedicated microprocessor, is also received within the assembly 10 and is in operative communication with a video screen and keyboard for purposes of data and instructional input and display.

Figure 2:
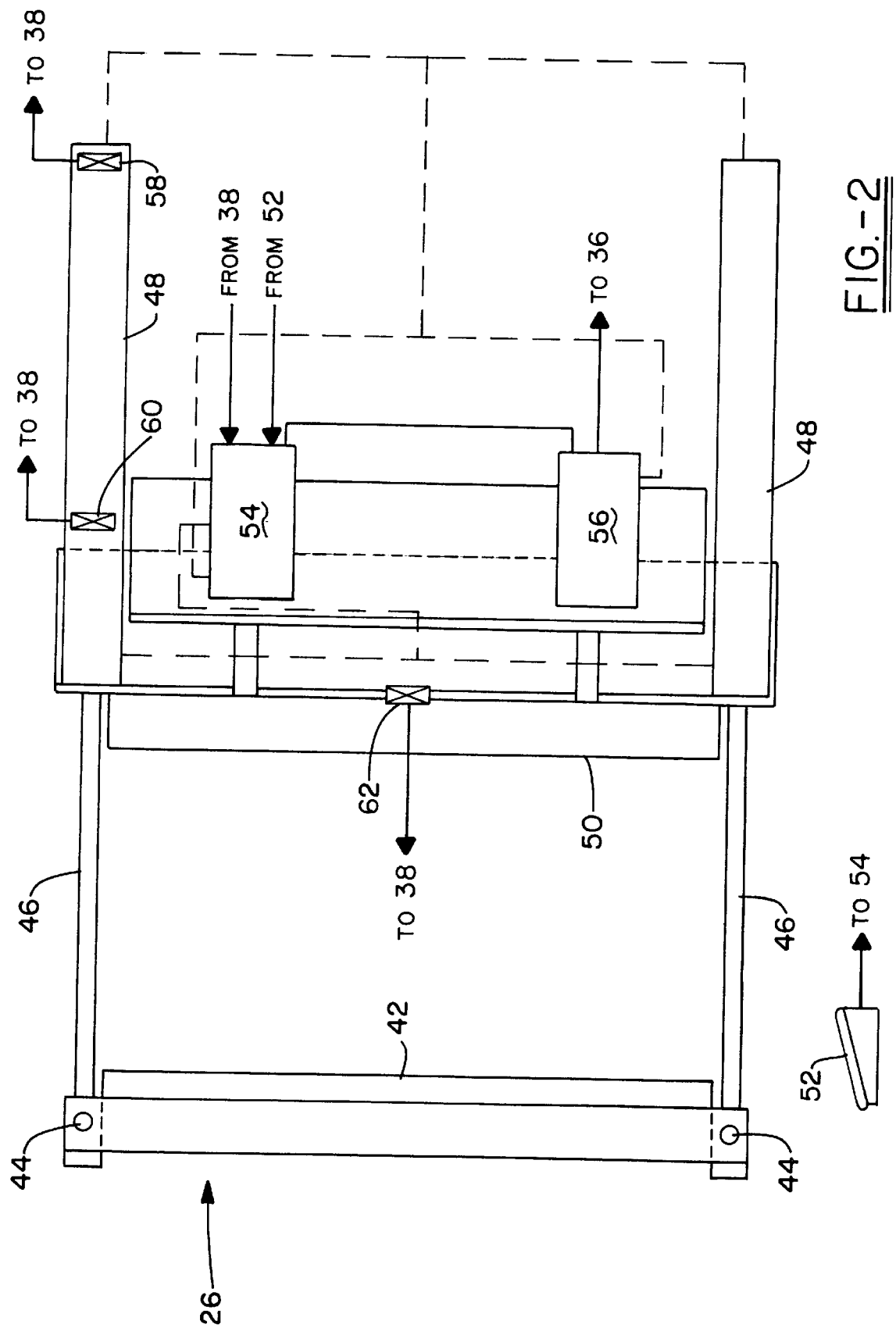
FIG. 2 is a schematic top plan view of the unit of FIG. 1.

As shown in FIGS. 1 and 2, a rubber pressure bar 42 is received by pivoting connectors 44 to reciprocating cylinder rods 46 maintained by cylinders 48. Those skilled in the art will appreciate that the cylinders 48 are preferably pneumatic in nature, although hydraulic cylinders or other types of actuation may be employed. A spring plate and heater bar 50 is maintained opposite the rubber pressure bar 42 in somewhat standard fashion. An operator actuated foot pedal 52 is connected to and is operative to activate a solenoid 54. The solenoid 54 actuates the cylinders 48 to draw the cylinder rods 46 and pivotally connected rubber pressure bar 42 toward spring plate and heater bar 50. The solenoid 54 also serves to actuate the solenoid 56 which turns the blower 36 off, when actuated. Accordingly, when the operator depresses the foot pedal 52, the solenoid 54 causes the solenoid 56 to turn off the air blower 36, while simultaneously activating the cylinders 48 to draw the rubber pressure bar 42 toward the spring plate and heater bar 50. As a consequence, the bag which is to be sealed between pressure bar 42 and spring plate and heater bar 50 is not being blown open when it is sealed and, accordingly, the seal may be effectuated without the capture of unnecessary air within the bag. A switch 58 is positioned at the end of one of the cylinders 48 to emit a signal to the control unit 38 when rubber pressure bar 42 has traveled sufficiently to make contacting sealing engagement with the spring plate and heater bar 50. The control unit 38 causes the cylinders 48 to retain the pressure bar 42 and spring plate/heater bar 50 in sealing engagement for a sufficient dwell time to assure that the bag has been sealed and the seal has cooled. The control unit 38 regulates the heating of the heater bar 50, accordingly.

A second switch 60 is interposed within one of the cylinders 48 to indicate that the rubber pressure bar 42 has made a return stroke away from the spring plate and heater bar 50 and that the system 10 is ready for another bag to be printed, indexed to the filling station 26 immediately below the blower 36 for filling and sealing by a repeat operation. A signal from the switch 60, indicating that the pressure bar 42 has extended from the spring plate and heater bar 50 allows the control 38 to effect such printing and indexing of a subsequent bag and renewal of the filling and sealing operation.

A safety switch 62 is maintained in association with the spring plate and heater bar assembly 50 and is operative to open when the spring plate is pushed in by the rubber pressure bar 42 against a spring biasing force. The safety switch 62, when opened by such force, indicates that a jam has occurred between the pressure bar 42 and spring plate and heater bar 50, with the output signal from the switch 62 being passed through the control unit 38 which, in turn, causes the solenoid 54 to effect return of the cylinders 48 to open the bite between the pressure bar 42 and spring plate and heater bar 50.

It will be appreciated by those skilled in the art that the control unit 38 regulates the feeding, positioning, opening and sealing of the bags used in association with the system 10. The actual registration of the bag is determined by monitoring a specific position of the bags within the system, rather than simply upon the timing of a drive scheme employed. In this regard, a particular bag configuration, as shown in FIG. 3, is employed. As shown, the web of bags 16 includes a plurality of serially connected bags 66a–66d which, as known to those skilled in the art, are formed from sleeves of polyethylene or polyproplyene film. Perforations 68 separate one bag from another within the web 16. The perforations 68 pass through one side of the sleeve forming the web. A slit 70 is placed through the other side of the sleeve opposite the perforations. Those skilled in the art will appreciate that the slit 70 serves as the opening in the sleeve into which materials can be placed by an operator, when blown open as by the blower 36. A sealed zone 72 is at an end of each bag opposite the slit 70, the sealed zone 72 being effected by fusing of the opposite layers of the polyethylene or polypropylene sleeve together as by the application of heat at that zone. The sealed zone 72 may be defined as either the top or bottom of the bag 66a–66d as desired. It will be seen that a lip 74 is positioned between the sealed zone 72 of one bag and the perforation 68 and slit 70 of the next adjacent bag. Again, whether the lip 74 is treated as the top or bottom of the associated bag is dependent only upon the desires of the user and the orientation and the use of the bag as more fully discussed below.

In accordance with the preferred embodiment of the invention, an aperture 76 passes through both sides of the sleeves forming the bags 66a–66b. There is preferably one aperture 76 per bag, and the aperture appears at the same location in each of the bags, being uniformly and repetitively spaced along the web. A web of bags 66b would, accordingly, have an aperture 76 passing through the lip 74 of each bag, while a web of bags 66c would have an aperture 76 passing through the major portion of each bag itself. Of course, the illustration in FIG. 3 is illustrative only, it being understood that the apertures 76 in any web 16 would always occur in the same location in each bag of the web. Those skilled in the art would, of course, appreciate that each of the bags 66a–66d would be sealed at a point immediately inside the bag area from the associated slit 70 and perforation 68. With that understanding, it will readily be appreciated that the bag 66b, having the aperture 76 in the lip 74 thereof, could allow the aperture 76 to serve as an aperture for hanging the bags, if desired. The bag 66c, having the aperture 76 passing through the major portion of the bag itself, would simply serve to allow the bags 66c to expel any air otherwise trapped therein. Accordingly, if the web 16 were configured to have bags 66b associated therewith, the lip 74 would generally serve as the top of the bag, the bottom of the bag being sealed interior of the bag 66b from perforation 68 separating the bag 66b from the bag 66c. If the web 16 is configured to have a series of interconnected bags 66c, with the aperture 76 serving only as an air expulsion hole, orientation of the top or bottom of the bag would not be so constrained. It will, of course, be appreciated that the web 16 would move in the direction of the arrow 78 in passing through the assembly 10 and filling station and sealer assembly 26. With reference again to FIG. 1, it can be seen that a sensing finger 20 rides upon the web of bags 16 opposite the electrically grounded roller bar 18. The finger 20 communicates with the control unit 38 and is so positioned as to be in alignment with the apertures 76 in each of the bags of the web 16. Accordingly, as each of the apertures 76 of a bag 66 passes by the finger 20, a signal is emitted to the controller 38. With the distance between the finger 20 and printing head 28 known, the exact position of a bag 66 with respect to the printing head 28 is also known by the controller 38 which can cause selected information, such as the materials to be placed into that bag, to be printed upon the bag. Upon completion of the filling and sealing cycle of the immediately preceding bag, the microprocessor 38 causes the drive wheels 24, 34 to index the next bag into a filling position and to similarly advance the transfer printing tape 30 for printing of the next succeeding bag. The microprocessor then awaits actuation of the foot pedal 32 as discussed above to indicate completion of a filling and sealing cycle, before indexing and printing the next succeeding bag.

In accordance with the invention, the bag last printed is next positioned at the station 26 and blown open by the blower 36 such that an operator can fill the bag with articles, such as medication or the like, listed on the bag and displayed on the screen 40. Operator actuation is achieved by means of the foot pedal 52 which, in turn, activates the solenoids 54, 56. When the switch 58 is actuated by movement of the rods 46 within the cylinders 48, closing pressure bar 42 upon the spring plate and heater bar 50, the control unit or microprocessor 38 actuates the heater bar 50 for a sufficient period to seal the bag and to allow the heater bar to then cool down. The control unit 38 then effectuates the release of solenoids 54, 56, releasing the actuation of the cylinders 48, and allowing return of the pressure bar 42. The operator may then tear the filled and sealed bags from the web 16 as by the perforations 68. When the open switch 60 indicates that the pressure bar 42 has made a full return, the control unit 38 causes the next bag to be printed and indexed and the process begins anew.

In accordance with the invention, the bag indexed to the filling station and sealer assembly 26 is the bag last printed by the printing head 28. The information printed upon the bag, including the specification of the materials to be placed therein, is displayed upon the screen 40 during the period of time that the bag is maintained at the filling station 26. Accordingly, the operator can simply monitor the screen and fill the bag. Moreover, to assure that registration has been maintained between the indexing of bags and the screen monitoring, the indicia printed upon the bags at the filling station 26 can be compared against that displayed upon the screen 40 as a periodic check.

It is, of course, important that the web of bags 16 be fed uniformly through the system 10 such that each bag to be filled is properly positioned at the filling station 26 and in appropriate registration with the sealing members 42, 50. In this regard, use of the voltage biased sensing finger 20, riding upon the electrically grounded roller bar 18 is important. Moreover, the registration of the finger 20 with the positioning of the slots or apertures 76 in each of the bags 66 is also important. The apertures 76 are of sufficient size to assure that the sensing finger 20 passes therethrough and makes direct contacting engagement with the grounded roller bar 18, thus emitting the appropriate signal to the control unit 38 to assure registration throughout the system 10. While it was previously believed that the finger 20 might be at a high voltage, such as on the order of several thousand volts, and that the finger would achieve registration by contacting the grounded roller bar 18 through the perforations 68, it was found after some period of time that such method of monitoring and registration was ineffective and problematic. Oftentimes, the perforations 68 were not sufficiently clear to allow for the necessary contact or proximity of the finger 20 with the roller bar 18. Moreover, arcing often occurred between the finger 20 and roller bar 18 through the perforations 68, and such arcing was often coupled, for example, to the control unit 38 or other operative portions of the system to provide false signals or introduce unwanted electrical noise.

By employing the enlarged apertures 76, of size sufficient to assure that the finger 20 makes direct contact with the grounded roller bar 18, the finger 20 can be connected to a low voltage source, such as 24 volts or less, precluding the problems otherwise experienced with high voltage operation.

Thus it can be seen that the objects of the invention have been satisfied by the structure presented above. While in accordance with the patent statutes only the best mode and preferred embodiment of the invention has been presented and described in detail, the invention is not limited thereto or thereby. Accordingly, for an appreciation of the true scope and breadth of the invention reference should be made to the following claims.

What is claimed is:

1. A packaging system, comprising:
   a roll of bags to be filled with product;
   a filling station to which bags are indexed and at which the product is placed into the bags and the bags are sealed;
   a printer interposed between said roll of bags and said filling station; and
   a control unit operatively interconnected between said roll of bags, printer and filling station, said control unit effecting the printing, indexing, filling and sealing of said bags, and effecting the printing of a bag only after an immediately prior bag has been sealed.

2. The packaging system according to claim 1, wherein said control unit includes a video screen displaying the specific product to be placed into a bag at said filling station.

3. The packaging system according to claim 2, wherein said control unit causes said printer to print information onto said bags relative to the product to be placed therein.

4. The packaging system according to claim 1, wherein said filling station comprises:

a heater bar;

a pressure bar in selective engagement with said heater bar;

an operator actuated switch; and a first solenoid interconnected between said control unit, pressure bar, and operator actuated switch, said first solenoid urging said pressure bar into engagement with said heater bar in response to said operator actuated switch, and releasing said engagement after a predetermined time in response to said control unit.

5. The packaging system according to claim 4, wherein said filling station further comprises a blower, blowing air into and thereby opening said bags, and a second solenoid connected to said blower for activating and deactivating said blower, said second solenoid turning off said blower when said first solenoid actuates said pressure bar.

6. The packaging system according to claim 4, wherein said filling station further comprises a first switch operatively connected to said pressure bar and said control unit, said first switch providing an output signal to said control unit when said pressure bar is in sealing engagement with said heater bar.

7. The packaging system according to claim 6, wherein said filling station further comprises a second switch operatively connected to said pressure bar and said control unit, said second switch providing an output signal to said control unit when said pressure bar has withdrawn from said heater bar by a predetermined amount.

8. The packaging system according to claim 7, wherein said filling station further comprises a third switch operatively connected to said heater bar and said control unit, said third switch providing an output signal to said control unit when said heater bar is jammed.

9. The packaging system according to claim 1, further comprising a sensor in communication with said control unit and with a web of said bags between said roll and said filling station, said sensor providing a signal to said control unit indicative of a position of said bags of said web as said web travels through said system.

10. The packaging system according to claim 9, wherein said sensor comprises an electronically conductive finger riding against said web of bags as said web of bags passes over a grounded roller.

11. The packaging system according to claim 10, wherein said bags are separably interconnected in said web by perforations passing therethrough.

12. The packaging system according to claim 11, wherein each said bag has an aperture therein apart from perforations, said aperture passing through said bag, and said finger riding upon said web of bags in registration with said apertures, said finger contacting said grounded roller upon receipt by each said aperture.

13. A method for filling bags with product, comprising:

indexing a continuous web of bags, one-by-one, to a printing station;

printing information on a bag at the printing station relative to a product to be placed into the bag;

indexing the continuous web of bags, one-by-one, from the printing station to a filling station, presenting the printed bag at the filling station;

filling product into the printed bag at the filling station, sealing the filled printed bag and removing the sealed, filled printed bag from the web; and continuing the sequential printing, filling, sealing and removing until a desired quantity of such bags has been processed, wherein the step of printing a bag is effected only after an immediately prior bas has been sealed.

14. The method for filling bags according to claim 13, further comprising the step of monitoring a screen identifying the product to be filled into the printed bag.

15. The method for filling bags according to claim 14, wherein said screen identifies both a type and quantity of product.

\* \* \* \* \*